UNITED STATES PATENT OFFICE 1,987,546

PROCESS FOR THE MANUFACTURE OF BASIC ESTERS OF PHENYL SUBSTITUTED FATTY ACIDS

André Blankart, Basel, Switzerland, assignor to Hoffmann-La Roche Inc., Nutley, N. J., a corporation of New Jersey No Drawing. Application March 1, 1934, Serial No. 713,613. In Germany July 6, 1933

4 Claims. (Cl. 260—103)

United States Patent No. 1,932,341 covers a process which consists in converting aminoalcohols of the formula

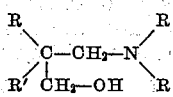

wherein R represents an alkyl, R' an alkyl or hydrogen, into their esters with phenyl substituted fatty acids.

It has now been found, that these esters are very easily obtained if halogen-alkyl-amino compounds of the general formula

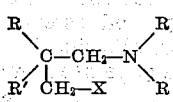

wherein R again represents an alkyl, R' an alkyl or hydrogen and X a halogen atom, are allowed to react with the salts of phenyl substituted fatty acids. The hitherto unknown halogen-compounds of these aminoalcohols are obtained from the alcohols mentioned above with a good yield by reaction with the usual halogenating agents, such as for instance thionyl chloride. They are colourless oils, which distil in vacuo without decomposition and form solid salts with halogen acids.

The new process may be employed for obtaining all the known esters of acids with the aforesaid aminoalcohols. It is used to advantage in cases where the acid halogenides are not at all or only difficultly available, as for instance the tropic acid- or the mandelic acid-chloride.

Example 1

204 parts by weight of dry potassium tropate and 190 parts by weight of 2,2-dimethyl-3-piperidino-propyl-chloride (obtained from 2,2-dimethyl-3-piperidino-propanol and thionyl chloride, a liquid boiling at 98° C. under 13 mm pressure, its hydrochloride melting at 165° C.) are boiled for some time with a reflux condenser with 800 parts by weight of benzene. The benzene solution is then shaken with the calculated quantity of dilute acid. To the neutralized aqueous solution a concentrated sodium-perchlorate solution is added, and the precipitated heavy oil separated from the mother liquor. It is washed by decanting with a little distilled water. By shaking with ammonia solution and ether the free ester base is taken up with ether. The tropic ester of 2,2-dimethyl-3-piperidino-propanol is obtained by evaporation in the form of a colourless oil.

The tropic ester of 2,2-dimethyl-3-piperidino-propanol is represented by the following formula:

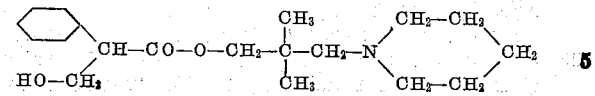

Example 2

20 parts by weight of potassium tropate and 18 parts by weight of 2,2-dimethyl-3-diethylamino-propyl-chloride (boiling point at 14 mm 78° C.; melting point of the hydrochloride 112° C.) are boiled for three hours with 80 parts by weight of benzene. The benzene solution is shaken with water and some ammonia, the benzene evaporated in vacuo, the ester base taken up in alcohol and neutralized with an alcoholic solution of phosphoric acid. After some time the primary phosphate of the tropic ester of 2,2-dimethyl-3-diethylamino-propanol is precipitated in crystalline form. After one single recrystallization from alcohol its melting point is 139° C.

The tropic ester of 2,2-dimethyl-3-diethylamino-propanol is represented by the following formula:

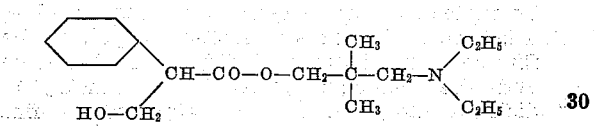

Example 3

94 parts by weight of sodium d-tropate are boiled in a solution of 97 parts by weight of 2,2-dimethyl-3-diethylamino-propyl-chloride in 350 parts by weight of acetone for 36 hours with a reflux condenser while stirring. After cooling the precipitated sodium chloride is filtered off, the acetone evaporated, the residue taken up in ether and shaken with dilute acid. From the acid solution the ester is separated by adding ammonia solution and thereafter the ester is again taken up in ether. After this solution has been dried, the ether is evaporated and the residue is neutralized with the calculated quantity of phosphoric acid. To the concentrated aqueous solution of the salt thus obtained ten times its quantity of acetone is added. After some time the phosphate of the d-tropic ester of 2,2-dimethyl-3-diethylamino-propanol crystallizes in fine needles. It melts at 124° C. and rotates the plane of polarization to the right; $[\alpha]_D = +28°$.

The d-tropic ester of 2,2-dimethyl-3-diethylamino-propanol is represented by the following formula:

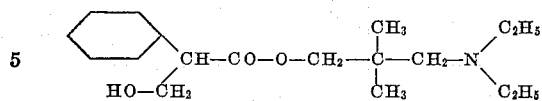

Example 4

20 parts by weight of dry potassium 1-tropate are boiled with 18 parts by weight of 2,2-dimethyl-3-dimethylamino-propyl-chloride (obtained from dimethylamino - dimethyl-propanol - hydrochloride by heating with thionyl chloride) and 100 parts by weight of benzene for three hours with a reflux condenser. The reaction product is filtered from the residue, shaken with dilute hydrochloric acid and the perchlorate of the ester precipitated in the form of an oil by adding a concentrated sodium-perchlorate solution. The oil is separated, washed with water and then shaken with ether and sodium-carbonate solution. The ethereal solution is dried and evaporated. The 1-tropic ester of 2,2-dimethyl-3-dimethylamino-proponal remains as a colorless oil, which is heavier than water. Its salts with the common acids are liquid. The rotatory power of the 1-tropic ester of 2,2-dimethyl-3-dimethylamino-propanol is $[\alpha]_D = -44°$.

The 1-tropic ester of 2,2-dimethyl-3-dimethylamino-propanol is represented by the following formula:

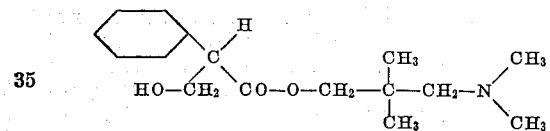

Example 5

19 parts by weight of potassium mandelate are added to a solution of 15 parts by weight 2,2-dimethyl-3-diethyl-amino-propyl-chloride in 100 parts by weight of xylol and heated while stirring for 10 hours at 110° C. After cooling the solution is stirred with water and acid, the aqueous layer removed and the ester precipitated by adding soda. The ester is taken up in ether, dried with dehydrated sodium sulphate, the filtered solution evaporated to a small volume and the mandelic ester of 2,2-dimethyl-3-diethylamino-propanol thus obtained in fine crystals, which after recrystallization melts at 67° C.

The mandelic ester of 2,2-dimethyl-3-diethylamino-propanol is represented by the following formula:

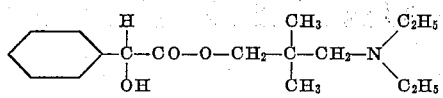

I claim:

1. The process for the manufacture of phenyl substituted fatty acid esters of aminoalcohols, which consists in allowing halogen-alkyl-amino compounds of the general formula

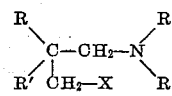

wherein R represents an alkyl, R' an alkyl or hydrogen, and X a halogen atom, to react with salts of phenyl substituted fatty acids.

2. The process for the manufacture of phenyl substituted fatty acid esters of aminoalcohols, which consists in allowing halogen-alkyl-amino compounds of the general formula

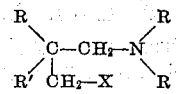

wherein R represents an alkyl, R' an alkyl or hydrogen and X a chlorine atom, to react with salts of phenyl substituted fatty acids.

3. The process for the manufacture of phenyl substituted fatty acid esters of aminoalcohols, which consists in allowing halogen-alkyl-amino compound of the general formula

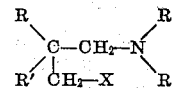

wherein R represents an alkyl, R' an alkyl or hydrogen and X a chlorine atom, to react with the potassium salts of phenyl substituted fatty acids.

4. The process for the manufacture of the tropic ester of 2,2-dimethyl-3-diethylamino-propanol, which consists in allowing 2,2-dimethyl-3-diethylamino-propyl-chloride to react with potassium tropate.

ANDRÉ BLANKART.